United States Patent
Singh et al.

(10) Patent No.: US 6,853,697 B2
(45) Date of Patent: Feb. 8, 2005

(54) HERMETICALLY SEALABLE TRANSFER CASK

(75) Inventors: Krishna P. Singh, Palm Harbor, FL (US); Stephen J. Agace, Marlton, NJ (US)

(73) Assignee: Holtec International, Inc., Marlton, NJ (US)

( * ) Notice: Subject to any disclaimer, the term of this patent is extended or adjusted under 35 U.S.C. 154(b) by 0 days.

(21) Appl. No.: 10/453,114

(22) Filed: Jun. 3, 2003

(65) Prior Publication Data

US 2004/0109523 A1 Jun. 10, 2004

Related U.S. Application Data

(62) Division of application No. 10/122,819, filed on Apr. 12, 2002, now Pat. No. 6,625,246.

(51) Int. Cl.[7] .................................................. G21C 19/02
(52) U.S. Cl. .................... 376/272; 376/261; 376/262; 376/263; 376/264; 250/506.1; 250/507.1; 403/11; 403/12; 403/13; 403/14; 403/15; 403/16; 403/17; 403/18; 403/19; 403/20; 403/21; 403/22
(58) Field of Search ................................. 376/261–264, 376/272; 250/506.1, 507.1; 403/11–22

(56) References Cited

U.S. PATENT DOCUMENTS

| | | | | |
|---|---|---|---|---|
| 3,739,451 A | * | 6/1973 | Jacobson ..................... 29/237 |
| 3,745,707 A | * | 7/1973 | Herr ............................ 49/449 |
| 3,836,267 A | * | 9/1974 | Schatz ......................... 403/17 |
| 3,935,062 A | * | 1/1976 | Keller et al. ................ 376/264 |
| 3,984,942 A | * | 10/1976 | Schroth ..................... 49/477.1 |
| 4,078,968 A | * | 3/1978 | Golden et al. .............. 376/205 |
| 4,158,599 A | * | 6/1979 | Andrews et al. ............ 376/262 |
| 4,278,892 A | * | 7/1981 | Baatz et al. ............... 250/506.1 |
| 4,288,698 A | * | 9/1981 | Baatz et al. ............... 250/506.1 |
| 4,355,000 A | * | 10/1982 | Lumelleau .................. 376/205 |
| 4,394,022 A | * | 7/1983 | Gilmore ...................... 277/377 |
| 4,526,344 A | * | 7/1985 | Oswald et al. .............. 254/9 C |
| 4,635,477 A | * | 1/1987 | Simon ...................... 73/290 R |
| 4,671,326 A | * | 6/1987 | Wilhelm et al. .............. 138/93 |
| 4,690,795 A | * | 9/1987 | Hardin et al. ............... 376/264 |
| 4,764,333 A | * | 8/1988 | Minshall et al. ............ 376/203 |
| 5,182,076 A | * | 1/1993 | de Seroux et al. .......... 376/250 |
| 5,319,686 A | * | 6/1994 | Pizzano et al. ............. 376/272 |

(List continued on next page.)

*Primary Examiner*—Michael J. Carone
*Assistant Examiner*—John Richardson
(74) *Attorney, Agent, or Firm*—Michael B. Fein, Esq.; Brian L. Belles, Esq.; Cozen O'Connor

(57) ABSTRACT

An apparatus, transfer cask, system, and method for defueling a nuclear reactor and transferring spent nuclear fuel from a spent nuclear fuel to a storage cask for long terms storage. In one aspect, the invention is an apparatus for use in transferring a canister of spent nuclear fuel from a transfer cask to a storage cask, the apparatus comprising a radiation absorbing shield surrounding a portion of a hole through which the canister can pass; means for securing the apparatus to the top surface of the storage cask; means for securing the bottom surface of the transfer cask to the apparatus; wherein the transfer cask securing means and the storage cask securing means are positioned on the apparatus so that when the apparatus is secured to both the transfer cask and the storage cask, the cavity of the transfer cask, the hole, and the cavity of the storage cask are substantially aligned; and means for moving the bottom lid in a horizontal direction once the bottom lid is unfastened from the bottom surface. In another aspect the invention is a transfer cask with a sealable bottom lid. In yet another aspect, the invention is system comprising the above described apparatus, transfer cask, and a storage cask. In still another aspect, the invention is a method of using the system of the present invention to defuel a nuclear reactor and transfer the spent nuclear fuel form a spent nuclear fuel pool to a storage cask.

13 Claims, 14 Drawing Sheets

U.S. PATENT DOCUMENTS

| | | | |
|---|---|---|---|
| 5,406,600 A | * | 4/1995 | Jones et al. .................. 376/272 |
| 5,438,597 A | * | 8/1995 | Lehnert et al. .............. 376/272 |
| 5,513,231 A | * | 4/1996 | Jones et al. .................. 376/261 |
| 5,546,436 A | * | 8/1996 | Jones et al. .................. 376/272 |
| 5,633,904 A | * | 5/1997 | Gilligan et al. .............. 376/272 |
| 5,661,768 A | * | 8/1997 | Gilligan et al. .............. 376/261 |
| 6,064,710 A | * | 5/2000 | Singh ......................... 376/272 |
| 6,538,259 B2 | * | 3/2003 | Matsunaga et al. ...... 250/506.1 |
| 6,625,246 B1 | * | 9/2003 | Singh et al. ................. 376/261 |

* cited by examiner

HERMETICALLY SEALABLE TRANSFER CASK

CROSS-REFERENCE TO RELATED APPLICATION

This application is a divisional application of Ser. No. 10/122,819 filed Apr. 12, 2002 U.S. Pat. No. 6,625,246. All applications are hereby incorporated by reference in their entireties.

BACKGROUND OF THE INVENTION

This invention relates to the field of transporting and storing spent nuclear fuel and specifically to transferring spent nuclear fuel from a spent nuclear fuel pool to a storage cask.

In the operation of nuclear reactors, it is customary to remove fuel assemblies after their energy has been depleted down to a predetermined level. In the commercial nuclear industry, fuel assemblies are typically an assemblage of long, hollow, zircaloy tubes filled with enriched uranium. Upon depletion and subsequent removal, spent nuclear fuel is still highly radioactive and produces considerable heat, requiring that great care be taken in its packaging, transporting, and storing. Specifically, spent nuclear fuel emits extremely dangerous neutrons and gamma photons. It is imperative that these neutrons and gamma photons be contained at all times.

In defueling a nuclear reactor, the spent nuclear fuel is removed from the reactor and placed in a canister that is submerged in a spent nuclear fuel pool. The pool facilitates cooling of the spent nuclear fuel and provides radiation shielding in addition to that which is supplied by the canister. However, the canister alone does not provide adequate containment of the radiation. As such, a loaded canister cannot be removed or transported from the spent nuclear fuel pool without additional radiation shielding. Because it is preferable to store spent nuclear fuel in a "dry state," the canister must eventually be removed from the spent nuclear fuel pool. As such, apparatus that provide additional radiation shielding during the transport and long-term storage of the spent nuclear fuel are necessary.

In state of the art facilities, this additional radiation shielding is achieved by placing the loaded canisters in large cylindrical containers called casks. There are two types of casks used in the industry today, storage casks and transfer casks. A transfer cask is used to transport canisters of spent nuclear fuel from location to location while a storage cask is used to store spent nuclear fuel in the "dry state" for long periods of time. Both transfer casks and storage casks have a cavity adapted to receive a canister of spent nuclear fuel and are designed to shield the environment from the radiation emitted by the spent nuclear fuel.

Storage casks are designed to be large, heavy structures made of steel, lead, concrete and an environmentally suitable hydrogenous material. However, because the focus in designing a storage cask is to provide adequate radiation shielding for the long-term storage of spent nuclear fuel, size and weight are often secondary considerations (if considered at all). As a result, the weight and size of storage casks often cause problems associated with lifting and handling. Typically, storage casks weigh approximately 150 tons and have a height greater than 15 ft. As such, a common problem associated with storage casks is that they are too heavy to be lifted by most nuclear power plant cranes. Another common problem is that storage casks are too large to be placed in spent nuclear fuel pools. Thus, in order to store a canister of spent nuclear fuel in a storage cask, the canister must be removed from the pool, prepared in a staging area, and transported to the storage cask. Adequate radiation shielding is needed throughout all stages of this transfer procedure.

Removal from the storage pool and transport of the loaded canister to the storage cask is facilitated by a transfer cask. In facilities utilizing transfer casks to transport loaded canisters, an empty canister is placed into the cavity of an open transfer cask. The canister and transfer cask are then submerged in the storage pool. As each assembly of spent nuclear fuel is depleted, it is removed from the reactor and lowered into the storage pool and placed in the submerged canister (which is within the transfer cask). The loaded canister is then fitted with its lid, enclosing the spent nuclear fuel and water from the pool within. The canister and transfer cask are then removed from the pool by a crane and set down in a staging area to prepare the spent nuclear fuel for storage in the "dry state." Once in the staging area, the water contained in the canister is pumped out of the canister. This is called dewatering. Once dewatered, the spent nuclear fuel is dried using a suitable process such as vacuum drying. Once dry, the canister is back-filled with an inert gas such as helium. The canister is then sealed and the canister and the transfer cask are once again lifted by the plant's crane and transported to an open storage cask. The transfer cask is then placed atop the storage cask and the canister is lowered into the storage cask.

Because it is imperative that the loaded canister is not directly exposed to the environment during the step of lowering the canister from the transfer cask into the storage cask, transfer casks have bottoms that can be withdrawn so that that the canister can be lowered directly into the storage cask. In prior art transfer casks, a rectangular compartment is attached to the bottom of the transfer cask. Within this rectangular compartment are two retractable sliding plates. When closed, these retractable plates act as the floor of the transfer cask's cavity on which the loaded canister rests. When fully retracted, the retractable plates leave an unobstructed path leading from the transfer cask to the storage cask through which the canister can be lowered. While the retractable plates and rectangular compartment provide radiation shielding for the canister as it passes between the transfer cask and the storage cask, this transfer cask design and transfer procedure have a number of deficiencies.

First off, it should be noted that the external surface of a loaded canister is in continuous contact with the ambient air after it is placed in a storage cask. Thus, it is desirable that the external surface of the canister remain free of any radioactive contamination. However, because it is virtually impossible to seal the retractable plates because of the hardware (rollers, tracks, etc.) required to make the plates retractable, the retractable plates of prior art transfer casks are ineffective in preventing the intrusion of pool water (which may contain radioactive particulates in emulsion) into the space between the canister's external surface and the walls of the transfer cask cavity. As such, the external surface of the canister can become contaminated. In order to deal with this threat of contamination, power plants employ a variety of measures such as continuously flushing the space with clean water from an external source. Such measures greatly complicate the process of fuel loading in the pool, leading to additional fuel loading time, added cost, and added risk to the operations staff who must work above the pool.

Second, as mentioned above, the transfer of the canister from the transfer cask to the storage cask occurs in a configuration where the transfer cask is stacked atop the storage cask. Because of the size of the transfer cask and storage cask, this stack can be quite tall, reaching heights of over thirty-five feet. Therefore, physical stability is a matter of concern, especially if a seismic event were to occur. As such, it is preferable to secure the transfer cask and the storage cask together to make the stack more robust. However, the presence of the retractable plate assembly at the bottom of the transfer cask precludes the design opportunity to configure a fastening detail. As a result, prior art transfer cask designs result in the undesirable situation where the transfer cask and the storage cask are stacked without being physically unconnected to each other.

Third, the retractable door assembly (including the retractable plates and the rectangular compartment) is quite heavy, reaching weights in excess of 12,000 lbs. As such, the area where radiation shielding is most needed, namely the cylindrical body of the transfer cask, must be made lighter to accommodate the heavy bottom region in order to remain within the lifting capacity of the power plant crane. Because the amount of radiation shielding provided by the transfer cask's cylindrical body is directly proportional to its weight, the heavy retractable door assembly results in a reduced amount of radiation shielding.

Fourth, the hardware of the retractable door assembly, such as the rollers and tracks, require lubricant or grease to work properly. Submersing this lubricant in the pool can result in the undesirable result of contaminating the pool water.

Finally, prior art transfer cask designs utilizing the retractable door assembly may not fit into the spent fuel pools of some nuclear power plants. This problem results because the rectangular compartments often have a large footprint which is necessitated by the presence of the retractable plates.

SUMMARY OF THE INVENTION

These and other problems are solved by the present invention which in one aspect is an apparatus for use in transferring a canister of spent nuclear fuel from a transfer cask to a storage cask, the transfer cask having a bottom surface, a bottom lid adapted to be secured to and unfastened from the bottom surface, and a cavity adapted for receiving the canister, the storage cask having a top surface and a cavity adapted for receiving the canister, the apparatus comprising: a radiation absorbing shield surrounding a portion of a hole through which the canister can pass; means for securing the apparatus to the top surface of the storage cask; means for securing the bottom surface of the transfer cask to the apparatus; wherein the transfer cask securing means and the storage cask securing means are positioned on the apparatus so that when the apparatus is secured to both the transfer cask and the storage cask, the cavity of the transfer cask, the hole, and the cavity of the storage cask are substantially aligned; and means for moving the bottom lid in a horizontal direction once the bottom lid is unfastened from the bottom surface.

It is preferable that the horizontal moving means be adapted to move the bottom lid between an open and closed position. When the horizontal moving means is in the open position, an unobstructed path is formed between the cavity of the transfer cask, through the hole of the mating apparatus, and into the cavity of the storage cask. When in the closed position, the horizontal moving means is in a position to receive the bottom lid of the transfer cask. Preferably, when the horizontal moving means receives the bottom lid and moves the bottom lid to the open position, the bottom lid together with the radiation absorbing shield substantially surround and enclose the hole, the hole being unobstructed. Also preferably, the bottom lid is circular and the radiation absorbing shield is U-shaped comprising a semi-circular portion and a pair of substantially parallel legs, the diameter of the bottom lid being substantially equal to a perpendicular distance between the legs. The horizontal moving means can comprise a slidable tray and the radiation absorbing shield can comprise low friction tracks on which the slidable tray may slide.

Preferably, the apparatus further comprises a top plate and bottom plate, the top and bottom plates having an opening through which the canister can pass, the openings substantially aligned with the hole. In this embodiment, the horizontal moving means comprises a slidable tray and the bottom plate comprises low friction tracks on which the slidable tray may slide.

Moreover, it is preferable for the apparatus to further comprise means for lowering the bottom lid of the transfer cask in a controlled manner onto the horizontal moving means when the transfer cask is secured to the apparatus and the bottom lid is unfastened. These lowering means can be one or more pneumatic or hydraulic lifters and can be located directly on the horizontal moving means.

The apparatus's means for securing the apparatus to the storage cask can be a plurality of bolt holes wherein the apparatus is secured to the top surface of the storage cask by extending bolts through the plurality of bolt holes and threadily engaging threaded holes located on the top surface of the storage cask. Additionally, the apparatus's means for securing the transfer cask can be a plurality of threaded holes, the transfer cask being secured to the apparatus by extending bolts through holes located on the bottom surface of the transfer cask and threadily engaging the plurality of threaded holes of the apparatus.

Preferably, the radiation absorbing shield is substantially U-shaped and is constructed of concrete or lead. Also, preferably, the means for securing the apparatus to the storage cask and the means for securing the apparatus to the storage cask are positioned on the apparatus so that the apparatus can be secured to and unfastened from both the transfer cask and storage cask simultaneously.

In another aspect, the invention is a transfer cask for transporting a canister of spent nuclear fuel from a spent nuclear fuel pool to a storage cask comprising a cylindrical body having a top surface, a bottom surface, and a cavity adapted for receiving the canister, the bottom surface comprising means for securing and unfastening a bottom lid and means for securing to a mating device, the top surface comprising means to secure a cask lid; a bottom lid, the bottom lid acting as a floor for the cavity when secured to the bottom surface; a cask lid; a bottom seal positioned between the bottom lid and the bottom surface; and an annulus seal at or near the top surface of the cylindrical body and positioned between the canister and the cylindrical body when the canister is resting in the cavity.

Preferably, when the bottom lid is secured to the bottom surface, a hermetic seal is formed. It is also preferable that the means for securing the bottom lid, and means for securing to the mating device, be positioned on the bottom surface so that the bottom lid can be unfastened and removed from the bottom surface while the transfer cask is secured to a mating device. If the bottom lid and bottom surface are circular, this can be accomplished by the circumference of the circular bottom being smaller than the circumference of the bottom surface.

Also, preferably, the bottom surface of the transfer cask is formed by a bottom flange. In this embodiment, the means for securing the bottom lid can be a plurality of bottom lid bolt holes wherein the bottom lid would comprise a plurality of threaded holes, the circular bottom lid being secured to the bottom flange by extending bolts through the bottom lid bolt holes and threadily engaging the threaded holes of the circular bottom lid. Additionally with respect to this embodiment, the means for securing to a mating device can be a plurality of mating device connection holes, the transfer cask being secured to a mating device by extending bolts through the mating device connection holes of the bottom flange and threadily engaging threaded holes located on the mating device. The bottom flange can be circular having an outer perimeter wherein the means for securing to the mating device are closer to the outer perimeter than the means for securing the bottom lid.

The bottom seal can be a gasket fitted in a groove on the bottom lid. Moreover, the annulus seal can be a circular gasket.

In yet another aspect, the invention is a system for transferring spent nuclear fuel from a spent nuclear fuel pool to a storage cask comprising a fuel canister, a transfer cask, a storage cask, and an apparatus as described above; the storage cask comprising a top surface, means for securing the apparatus, and a cavity adapted for receiving the canister; the transfer cask comprising a bottom surface, a bottom lid adapted to be secured and unfastened to the bottom surface, means for securing to the apparatus, and a cavity adapted for containing the canister.

In regards to the system, it is preferable that the transfer cask comprise a bottom seal positioned between the bottom lid and the bottom surface and an annulus seal positioned between the canister and the transfer cask when the canister is contained in the transfer cask cavity. It is also preferable that the apparatus's transfer cask securing means and storage cask securing means are positioned on the apparatus so that the apparatus can be secured to and unfastened from the transfer cask and storage cask simultaneously. Finally, the transfer cask's means for securing to the apparatus are preferably positioned on the transfer cask so that the bottom lid can be unfastened and removed from the bottom surface while the transfer cask is secured to the apparatus.

In still another aspect, the invention is a method for transferring spent nuclear fuel from a reactor to a storage cask comprising submersing a transfer cask having a removable bottom lid and a cavity containing a canister into a spent nuclear fuel pool; placing spent nuclear fuel in the canister; securing the apparatus of claim 1 to a storage cask having a cavity adapted for receiving the canister; removing the transfer cask from the pool and securing the transfer cask to the apparatus; unfastening the bottom lid and horizontally moving the bottom lid with the apparatus; and lowering the canister from the transfer cask into the cavity of the storage cask. It is preferable that this method further include the steps of securing a lid to the canister after placing the spent nuclear fuel in the canister; placing the transfer cask down in a staging area and preparing the canister for dry storage; and securing a cask lid to the transfer cask.

DETAILED DESCRIPTION OF THE DRAWINGS

Figure 1:
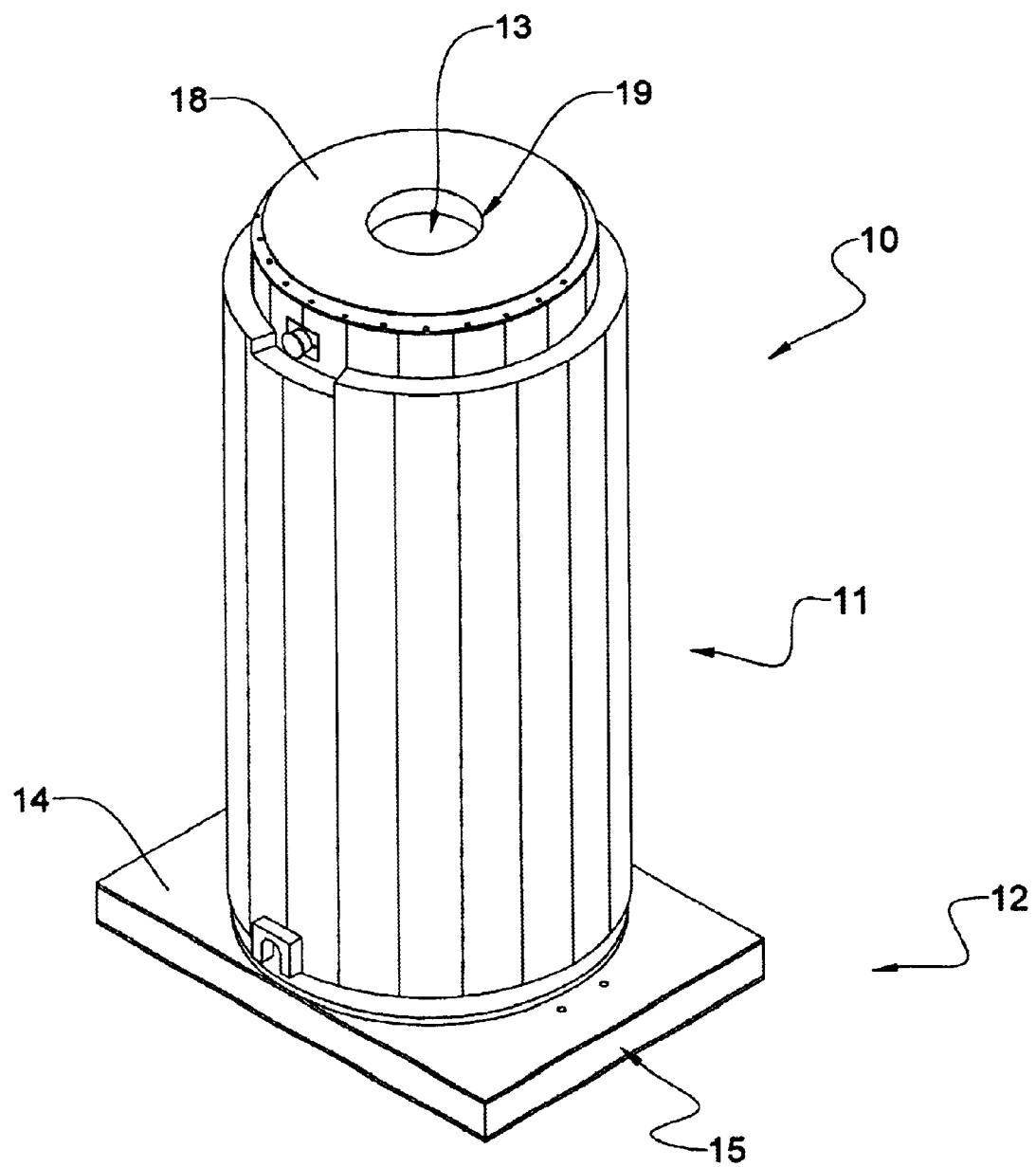
FIG. 1 is a perspective view of a prior art transfer cask having a retractable door assembly.

FIG. 1 illustrates a prior art transfer cask 10 having cylindrical body 11 and a retractable door assembly 12. In order to shield the environment from the radiation emitted by a canister of spent nuclear fuel once it is placed within cavity 13, cylindrical body 11 is typically constructed of a gamma absorbing material such as lead and a suitable hydrogenous material. Retractable door assembly 12 comprises rectangular compartment 14. Rectangular compartment 14 forms space 15 in which retractable plates 16, 17 (FIG. 2) are located. Prior art transfer cask 10 further comprises cask lid 18 having lid hole 19.

Figure 2:
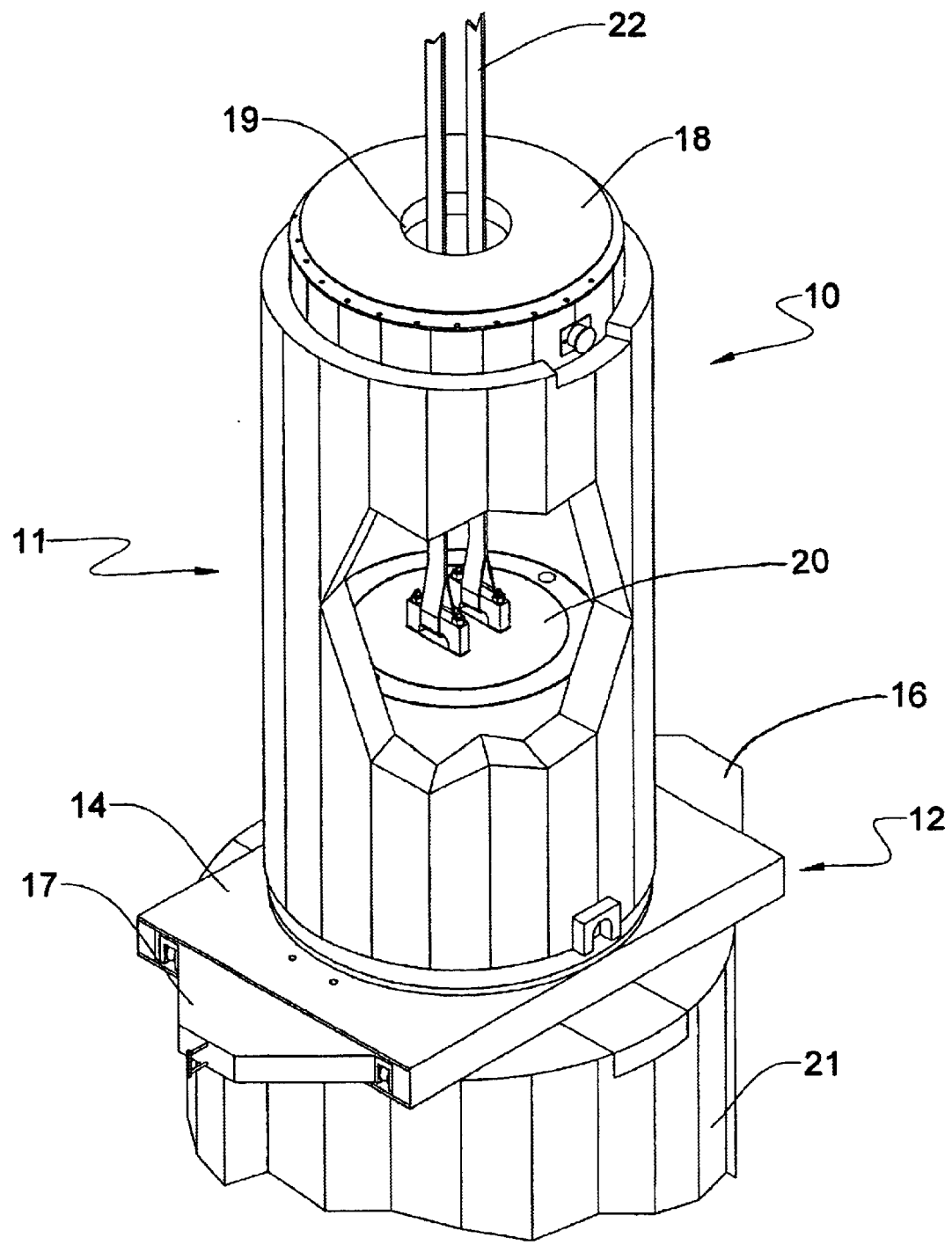
FIG. 2 is a perspective view of a prior art transfer cask having a retractable door assembly placed atop a storage cask with a canister of spent nuclear fuel being lowered from the prior art transfer cask into the storage cask.

Referring to FIG. 2, once prior art transfer cask 10 is loaded with a canister 20 of spent nuclear fuel, transfer cask 10 is positioned above and set atop storage cask 21. This is done in order to facilitate the transfer of canister 20 from transfer cask 10 to storage cask 21. However, as discussed in detail above, prior art transfer cask 10 is not secured to storage cask 21 during this process, transfer cask 10 merely rests atop storage cask 21. Once prior art transfer cask 10 is placed atop storage cask 21, retractable plates 16, 17 are moved to an open position. Retractable plates 16, 17 comprise rollers that require lubricant in order to move properly. Moving retractable plates 16, 17 to the open position results in an unobstructed path being formed between the cavity of transfer cask 10 and the cavity of storage cask 21. As such, canister 20 can be lowered by a crane 22 from prior art transfer cask 10 into storage cask 21 for permanent storage. As discussed above, prior art transfer cask 10 has a number of deficiencies.

Figure 3:
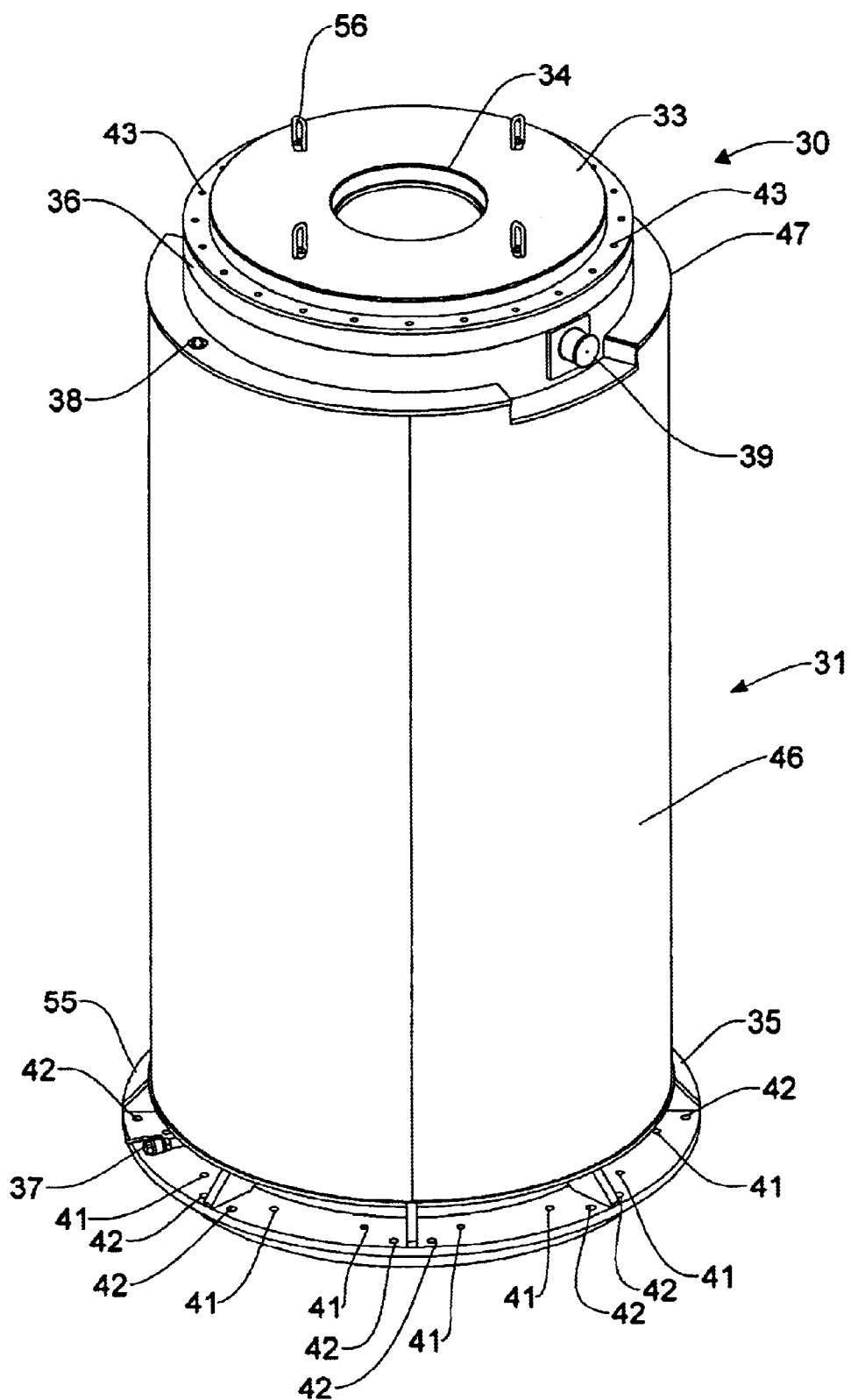
FIG. 3 is a perspective view of an embodiment of the transfer cask of the present invention, a transfer cask having a sealable bottom lid.

FIG. 3 illustrates an embodiment of the present invention, transfer cask 30 having sealable bottom lid 32. Transfer cask 33 comprises a cylindrical body 31, circular bottom lid 32, and cask lid 33. Cask lid 31 comprises cavity hole 34 and a plurality of cask lid bolt holes 43 circumferentially located around cask lid 31. Cavity hole 34 facilitates access to cavity 40 (FIG. 5) which is necessary to perform certain canister transfer operations. Cylindrical body 31 comprises bottom flange 35, top flange 36, drain valve 37, fill hole 38, and crane handles 39. Bottom flange 35 comprises a plurality of bottom lid bolt holes 41 and a plurality of mating device connection holes 42, both circumferentially located around bottom flange 35. For the reasons discussed below, mating device connection holes 42 are positioned closer to the outer perimeter 55 of bottom flange 35 than bottom lid bolt holes 41.

Figure 4:
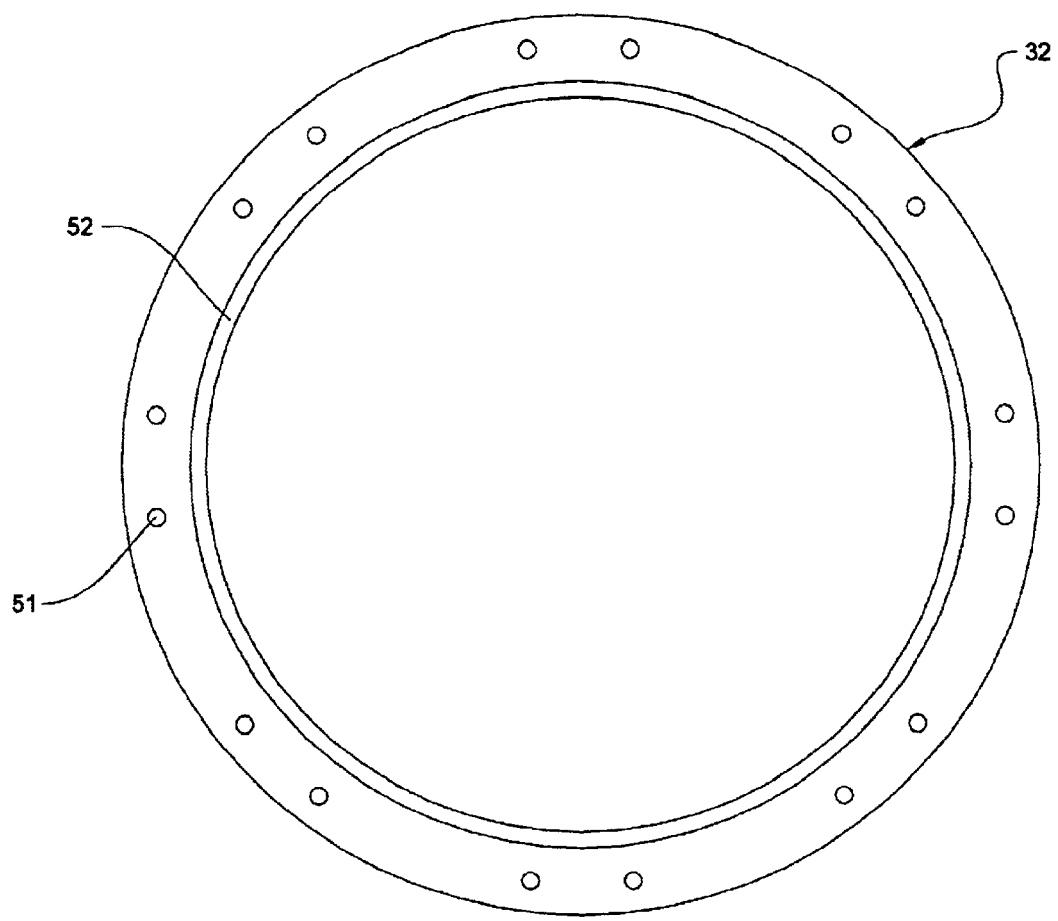
FIG. 4 is a top view of an embodiment of a bottom lid used to hermetically seal the bottom of the transfer cask of the present invention.
Figure 5:
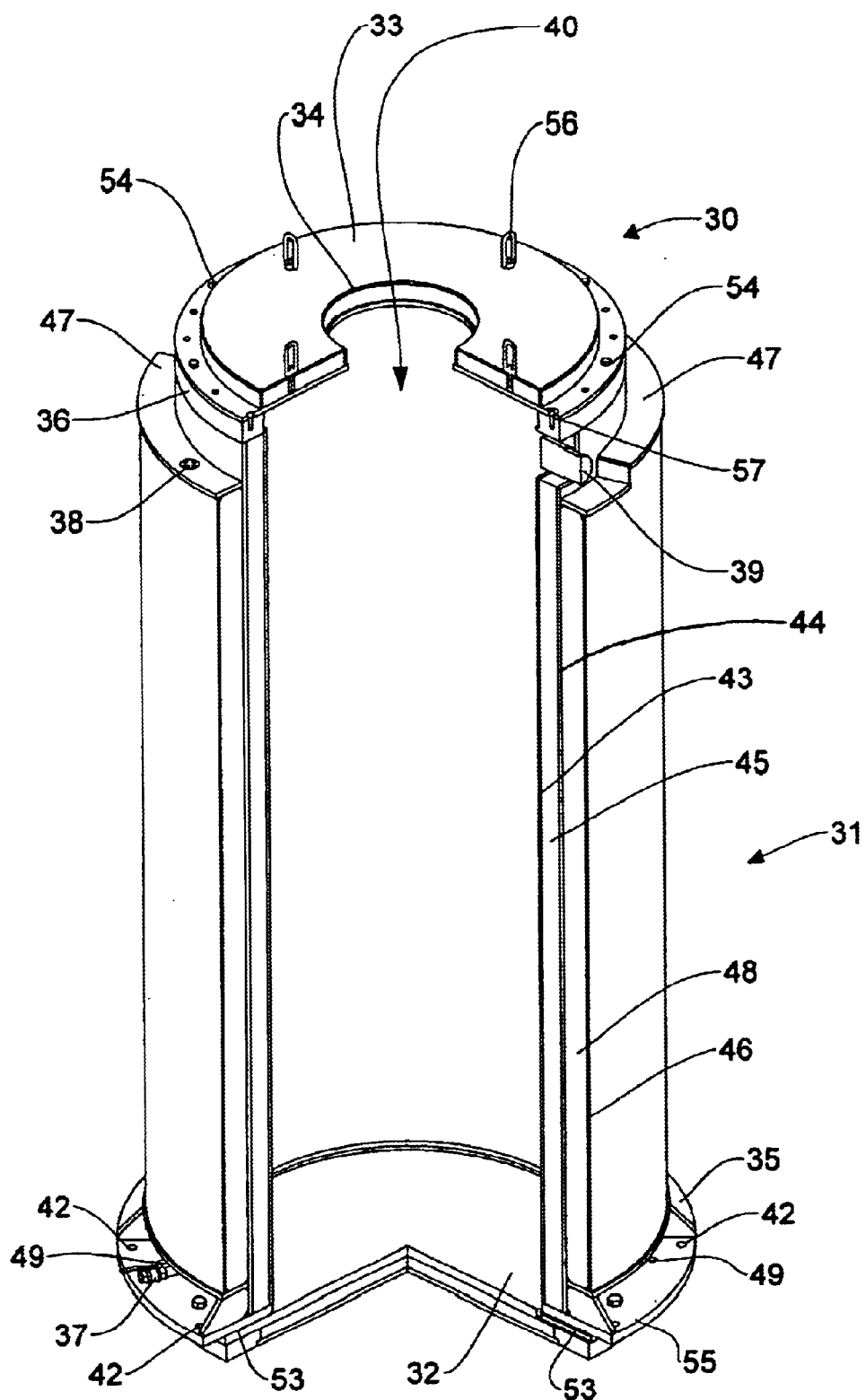
FIG. 5 is a perspective view of an embodiment of the transfer cask of the present invention partially in section.

Referring to FIG. 4, circular bottom lid 32 comprises a plurality of threaded holes 51 and circular groove 52. Circular groove 52 is adapted to receive circular gasket 53 (FIG. 5). Circular bottom lid 32 is preferably constructed of carbon steel and is of a thickness that provides adequate radiation shielding. Threaded holes 51 do not extend through the entire thickness of circular bottom lid 32. Moreover, circular bottom lid 32 can be a single circular plate or can be multiple circular plates welded or otherwise fastened together. As illustrated, circular bottom lid 32 comprises two circular plates welded together (FIG. 5).

Referring to FIG. 5, cylindrical body 31 of transfer cask 30 is constructed so as to provide adequate radiation shielding for a canister 50 (FIG. 6) of spent nuclear fuel placed within cavity 40. Cylindrical body 31 comprises cylindrical inner shell 43. Inner shell 43 forms cavity 40 within which canister 50 (FIG. 6) can be placed when cask lid 33 is removed. Bottom lid 32 acts as the floor of cavity 40 when secured. Cylindrical body 31 further comprises cylindrical outer shell 44 which is concentric with and surrounds inner shell 43. Both inner shell 43 and outer shell 44 are made from carbon steel. Inner shell 43 and outer shell 44 are welded to top flange 36 and bottom flange 35, forming an annulus 45 that is capable of holding radiation absorbing material such as concrete, lead, or steel. Lead is preferred because it most effectively provides gamma shielding for the radioactive spent nuclear fuel once it is placed within cavity 40.

Cylindrical body 31 further comprises jacket shell 46. Jacket shell 46 is concentric with and surrounds outer shell 44. Jacket shell 46 has top surface 47. The bottom of jacket shell 46 is welded to the top of bottom flange 35 while top surface 47 is welded to outer shell 44, forming a second annulus 48, referred to herein as "jacket 48." Jacket 48 is adapted for receiving a neutron absorbing liquid such as water, which provides a layer of neutron shielding for the radioactive spent nuclear fuel once it is placed in cavity 40. In order to facilitate easy filling and draining of jacket 48, jacket shell 46 comprises one or more drain valves 37 and one or more fill holes 38.

Additionally, transfer cask 30 comprises a plurality of radial plates (not shown) that extend radially from outer shell 44 to jacket shell 46. The radial plates are circumferentially located around transfer cask 30. Each radial plate is welded on one side to outer shell 44 and to jacket shell 46 on the other side. The radial plates act as fins for improved heat conduction.

In the illustrated embodiment, bottom flange 35 forms the bottom surface of cylindrical body 31. Circular bottom lid 32 is secured to bottom flange 35 by extending bolts 49 through bottom lid bolt holes 41 (FIG. 3) and threadily engaging corresponding threaded holes 51 (FIG. 4) located on circular bottom lid 32. As a result, cavity 40 is formed wherein circular bottom lid 32 acts as a floor. Before circular bottom 32 is secured to bottom flange 35, circular gasket 53 is fitted circular groove 52 (FIG. 4). Upon securing circular bottom lid 32 to bottom flange 35 by sufficiently tightening bolts 49, circular gasket 52 hermetically seals the bottom of cavity 40. As mentioned earlier bottom flange 35 further comprises mating device connection holes 42 located closer to outer perimeter 55 than bottom lid bolt holes 41. By positioning mating device connection holes 42 sufficiently closer to outer perimeter 55 than bottom lid bolt holes 41, transfer cask 30 can be secured to mating device 70 (FIG. 7) even when circular bottom lid 32 is secured to bottom flange 35.

Figure 6:
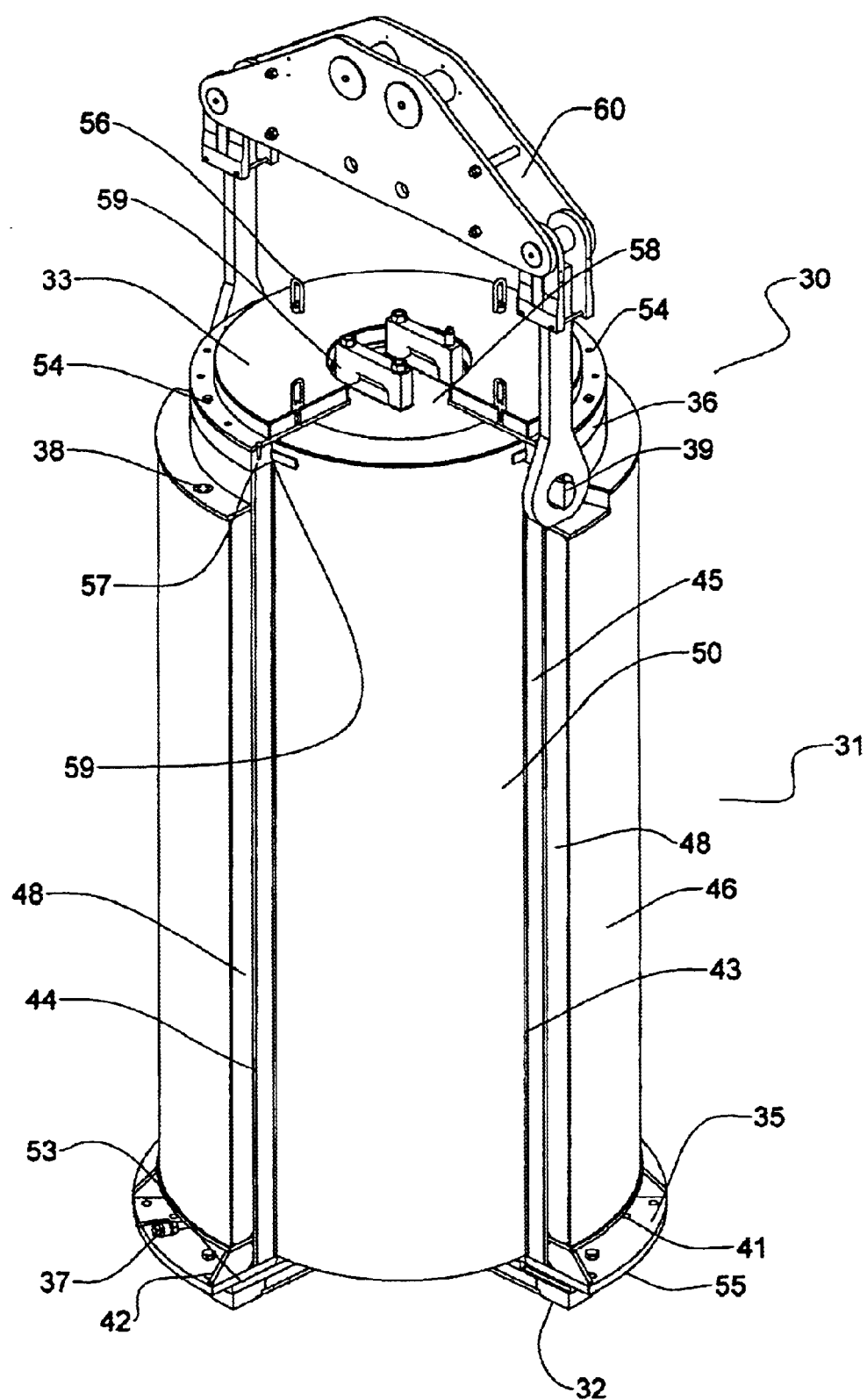
FIG. 6 is a perspective view of an embodiment of the transfer cask of the present invention partially in section and loaded with a canister of spent nuclear fuel.

In the illustrated embodiment, top flange 36 forms the top surface of cylindrical body 31. Top flange 36 comprises a plurality of circumferentially located threaded holes 57. Cask lid 33 is secured to cylindrical body 31 by extending bolts 54 through cask lid holes 43 (FIG. 3) and threadily engaging the threaded holes 57 of top flange 36. Cask lid 33 is constructed of concrete and carbon steel, so as to provide radiation shielding for the enclosed canister 50 (FIG. 6). Cask lid 33 also comprises lid handles 56 for facilitating the lifting and removing of cask lid 33.

Referring to FIG. 6, cavity 40 (FIG. 5) is adapted to receive a canister 50 when cask lid 33 is removed from cylindrical body 31. In the illustration, canister 50 is already placed into cavity 40 and cask lid 33 is secured to top flange 36. When canister 50 is in cavity 40, a small annulus (not labeled) is formed between inner shell 43 and the external wall of canister 50. This small annulus is a result of the diameter of canister 50 being slightly smaller than the diameter of cavity 40. As discussed earlier, gasket 53 hermetically seals the bottom of cavity 40 when circular bottom lid 32 is secured to bottom flange 35. In order to hermetically seal the top of cavity 40 when canister 50 is placed therein, annulus seal 59 is positioned between top flange 36 and the top of the external surface of canister 50. This results in the small annulus being hermetically sealed from the top in addition to the bottom. As such, the external surface of canister 50 is not exposed to pool water when transfer cask 30 and canister 50 are lowered into the pool as described below.

Finally, handles 39 facilitate crane 60 to engage, lift, and transport transfer cask 30 throughout the defueling, transfer, and storage procedures.

Figure 7:
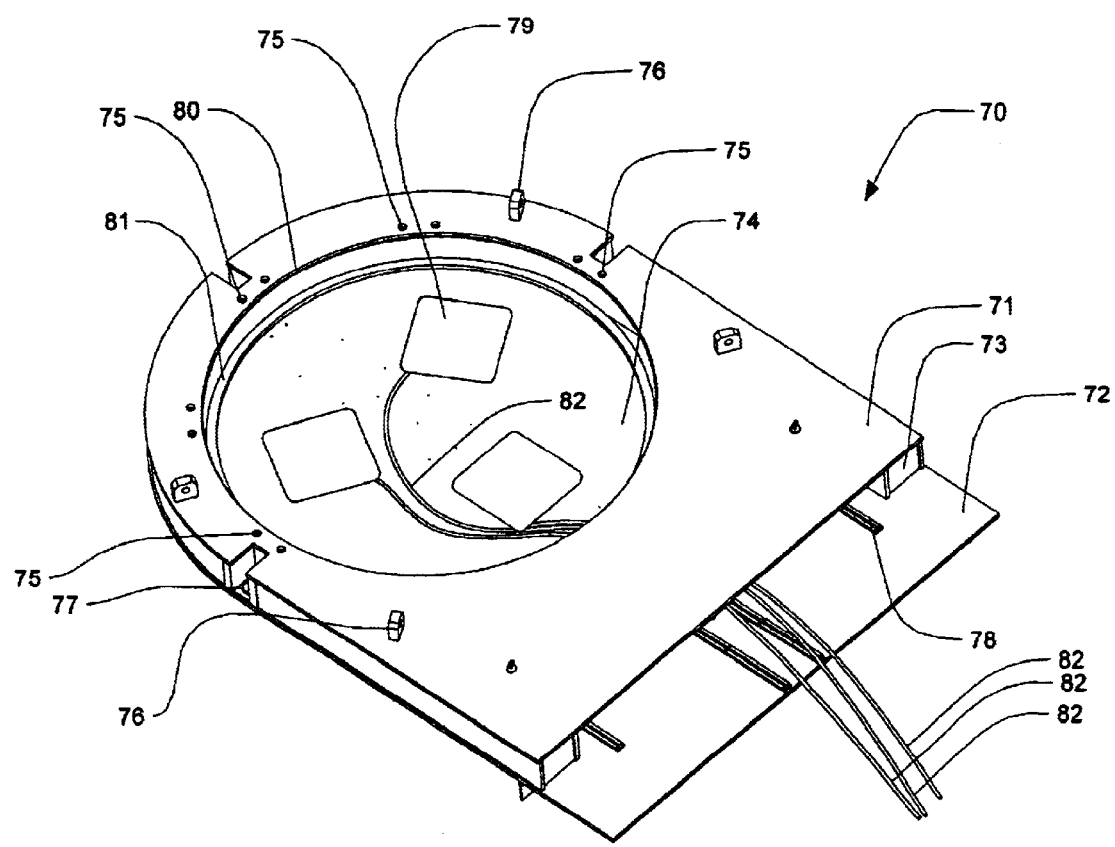
FIG. 7 is a perspective view of an embodiment of the apparatus of the present invention, a cask mating device wherein the mating device's slidable tray is in a closed position.

FIG. 7 illustrates an embodiment of the apparatus of the present invention, a cask mating device 70 for use in transferring a canister of spent nuclear fuel from the transfer cask of the present invention to a storage cask. In the illustrated embodiment, cask mating device 70 comprises top plate 71, bottom plate 72, radiation absorbing shield 73, and slidable tray 74. Bottom plate 72 and top plate 71 are constructed of carbon steel and are respectively welded to radiation absorbing shield 73 which comprises substantially U-shaped steel walls filled with a radiation absorbing material such as concrete.

Top plate 71 comprises a plurality of threaded holes 75, a plurality of guide extrusions 76, and opening 80. Threaded holes 75 extend into radiation absorbing shield 73 and are used to secure transfer cask 30 (FIG. 9) to mating device 70.

Threaded holes 75 are positioned near and partially surround opening 80. Opening 80 is adapted so that it is large enough so that canister 50 (FIG. 6) can pass through, 80 but small enough so that bottom flange 35 (FIG. 6) can rest on top plate 71 without falling into opening 80. Top plate 71 further comprises guide extrusions 76 which help correctly position transfer cask 30 (FIG. 9) atop mating device 70 when transfer cask 30 is being lowered onto and secured thereto.

Figure 8:
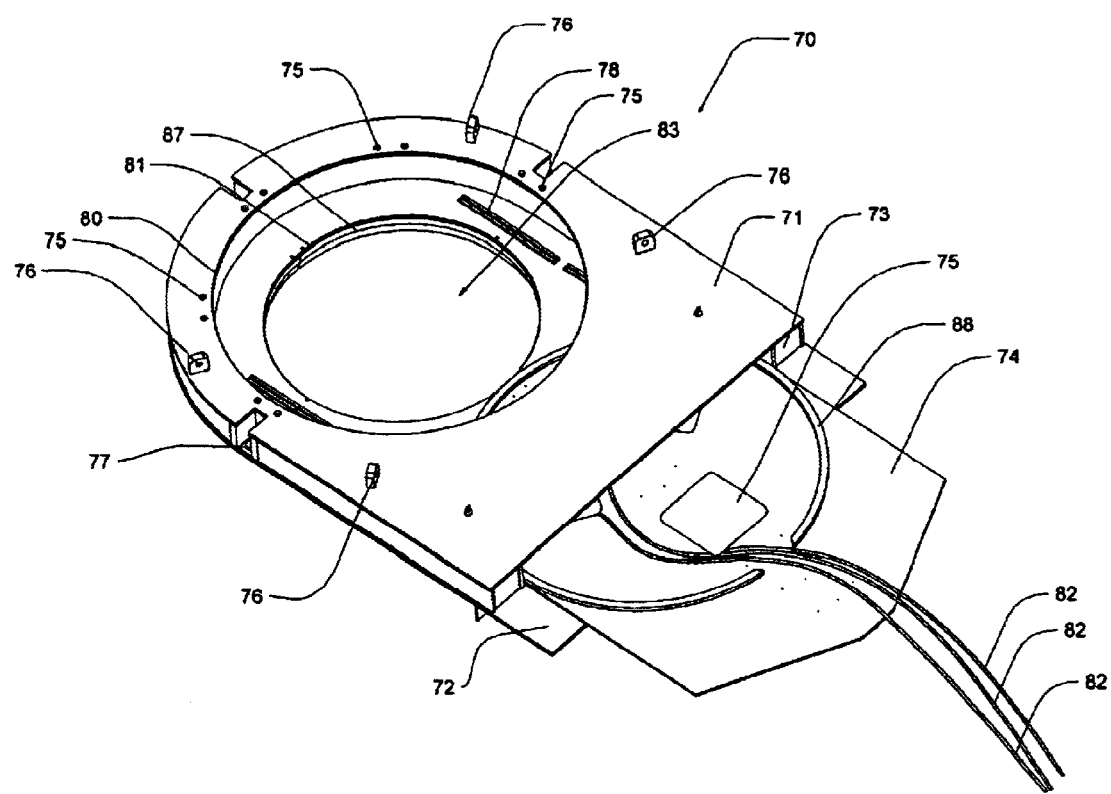
FIG. 8 is a perspective view of an embodiment of the apparatus of the present invention, a cask mating device wherein the slidable tray is in an open position.
Figure 9:
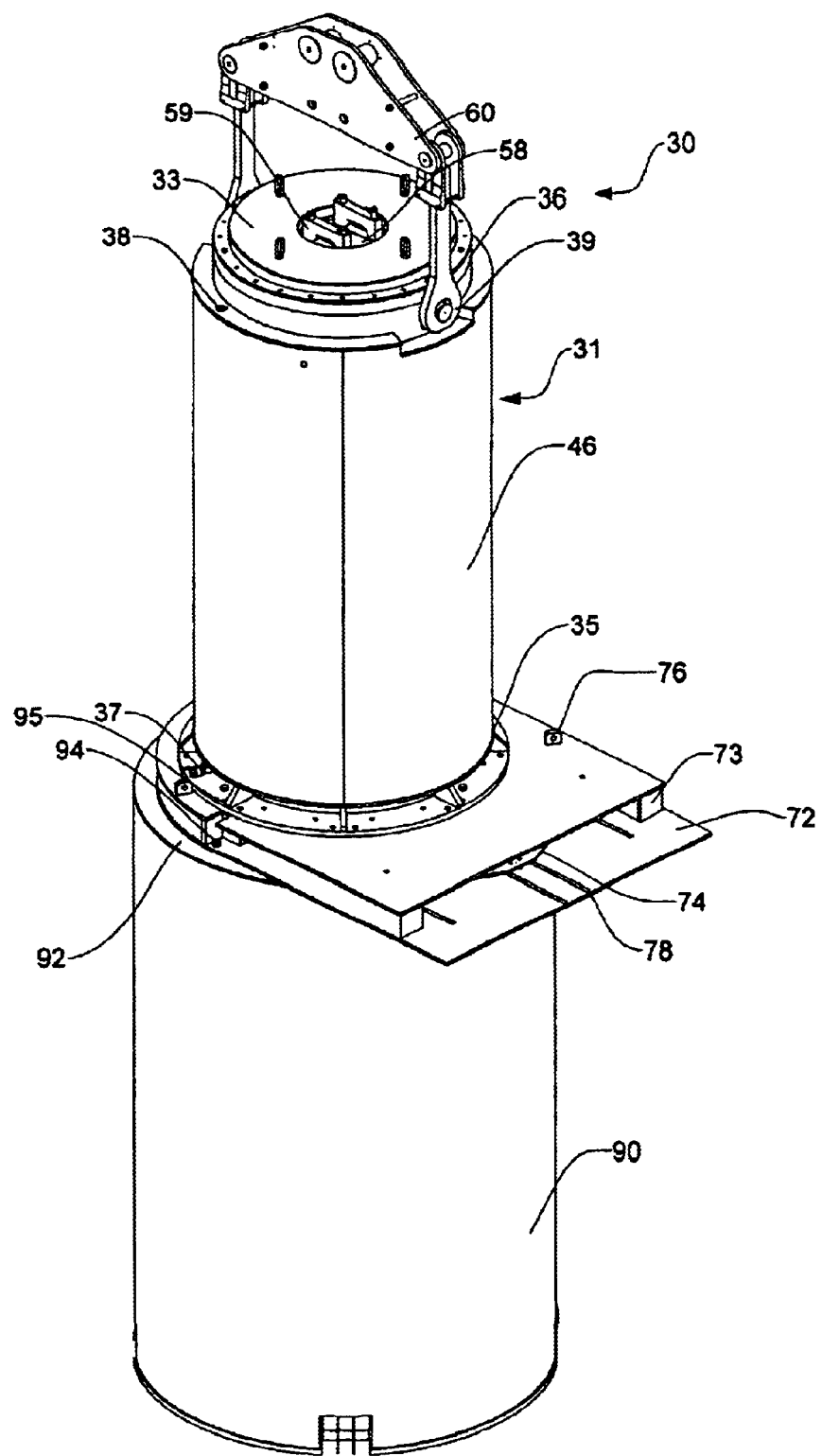
FIG. 9 is a perspective view of an embodiment of the system of the present invention, a transfer cask with a circular bottom lid, a mating device, and a storage cask, wherein the system is in a stacked arrangement.
Figure 14:
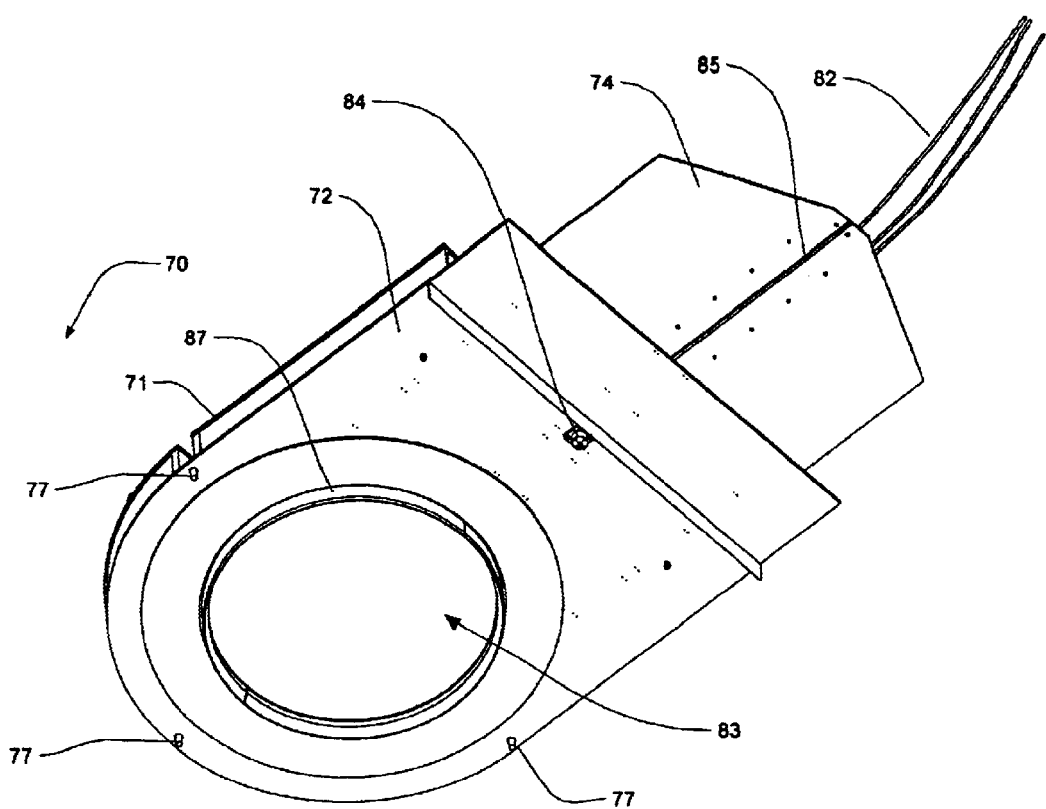
FIG. 14 is a perspective view of the underside of the apparatus of FIG. 8.

Bottom plate 71 comprises a plurality of storage cask connection holes 77, low friction tracks 78, and opening 81 (FIG. 8). Opening 81 is substantially aligned with opening 80 and adapted to be large enough so that canister 50 (FIG. 6) can pass through. Cask connection holes 77 are located in recesses in radiation absorbing shield 73. Storage cask connection holes 77 are used to secure mating device 70 to the top surface of storage cask 90 (FIG. 9). In the illustrated embodiment there are three cask connection holes 77 (although only one is visible). Bottom plate 72 further comprises low friction tracks 78 for guiding the horizontal movement of slidable tray 74. Low friction tracks 78 are constructed so as to not require lubricant or grease in order for slidable tray 74 to slide thereon. Specifically, low friction tracks 78 are constructed of steel and comprise roller bearings contained within steel guides, wherein only the roller bearings contact slidable tray 74. Referring to FIG. 14, horizontal movement of slidable tray 74 is afforded by a gear drive system comprising rack 85 and pinion 84. Slidable tray 74 has rack 85 welded to the bottom of slidable tray 74 to engage the gear system controlled by pinion 84 which controls the sliding motion. Power can be supplied to pinion 84 via hydraulic pressure, electric motor, compressed air, or human power.

As will be described in more detail below, slidable tray 74 comprises a plurality of pneumatic lifters 79 for controlled lowering of circular bottom lid 32 (FIG. 4). Pneumatic lifters 79 are supplied with air through pneumatic hoses 82 which are connected to a source of pressurized air. Moreover, slidable tray 74 comprises elevated ring 88 which is adapted to receive circular bottom lid 32 (FIG. 4) and stabilize circular bottom lid 32 when it is resting on slidable tray 74. Slidable tray 74 is constructed of steel and is capable of horizontal movement between a closed and an open position.

In FIG. 7, slidable tray 74 is in the closed position. When slidable tray 74 is in the closed position, slidable tray 74 covers opening 81 (FIG. 8) and is positioned so as to be capable of receiving circular bottom lid 32 (FIG. 4) when transfer cask 30 is secured to mating device 70 (FIG. 9).

Figure 11:
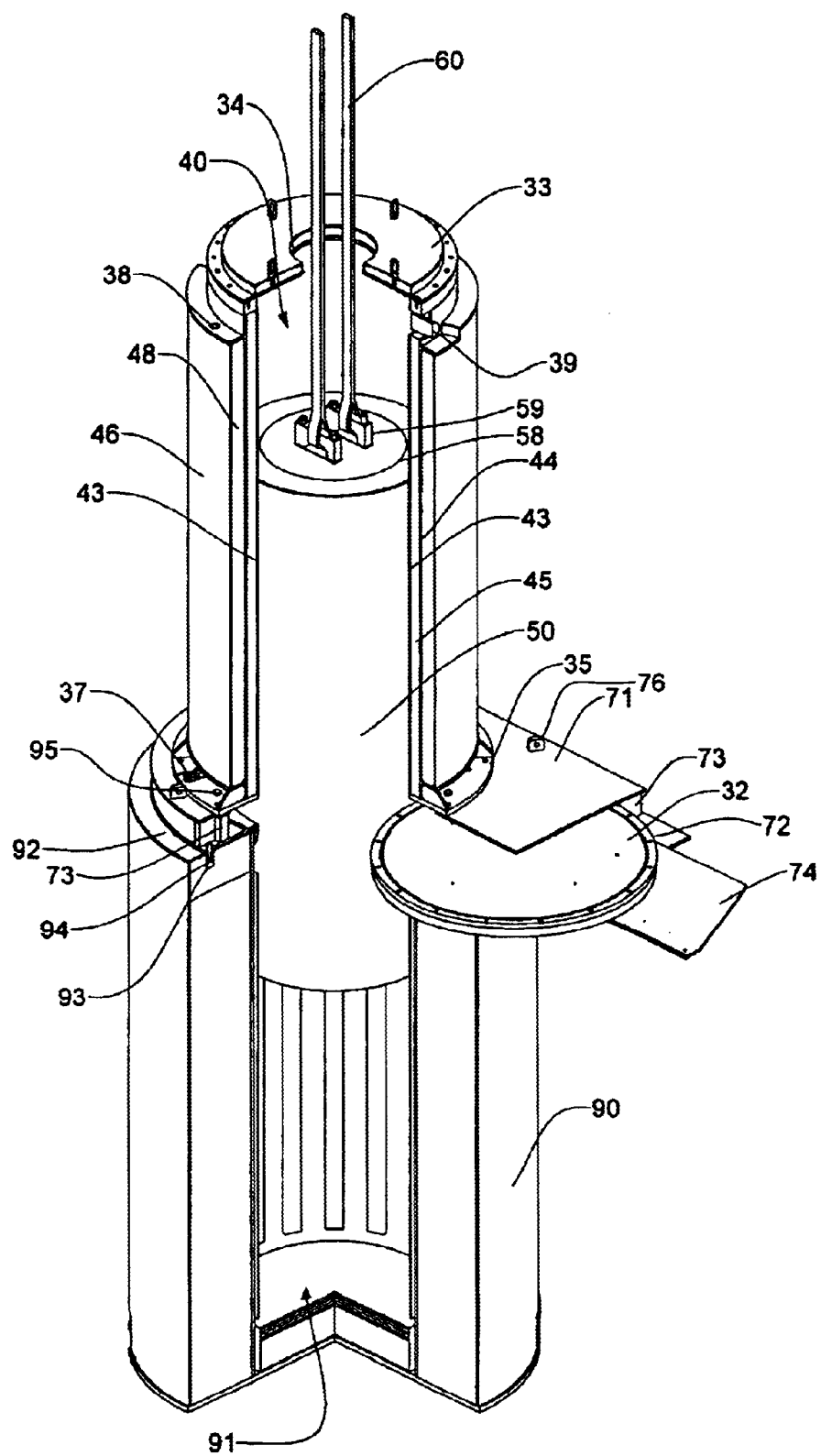
FIG. 11 is a perspective view of an embodiment of the system of the present invention in the stacked arrangement partially in section wherein the slidable tray is in the open position and the canister is being lowered into the storage cask.

Referring to FIG. 8, slidable tray 74 is in the open position. When slidable tray 74 is in the open position, slidable tray 74 does not obstruct opening 81. As such, canister 50 can pass from cavity 40 of transfer cask 30, through hole 83 and openings 80, 81, and into cavity 91 of storage cask 90 (FIG. 11). Radiation absorbing shield 73 partially surrounds hole 83 through which canister 50 can pass. Mating device 70 further comprises alignment ring 87 (best illustrated in FIG. 14) welded to bottom plate 72. Alignment ring 85 serves as a guide to help center mating device 70 on storage cask 90 (FIG. 9) during installation. Alignment ring 87 is preferably tapered to help guide or funnel a canister 50 (FIG. 12) from storage cask 90 and into transfer cask 30 in the event that it is necessary to withdraw canister 50 from storage cask 90.

Figure 12:
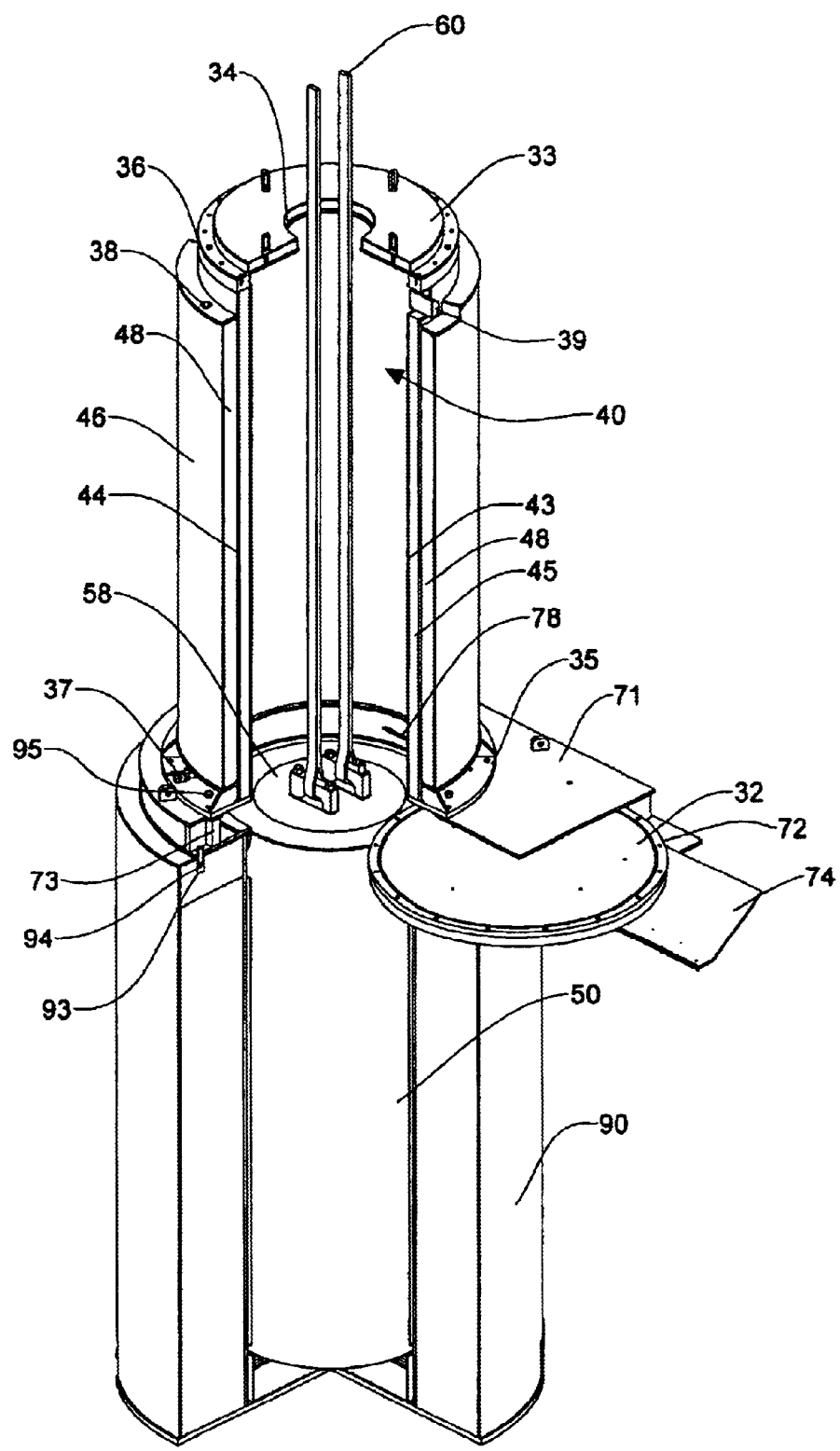
FIG. 12 is a perspective view of an embodiment of the system of the present invention in the stacked arrangement partially in section wherein the slidable tray is in the open position and the canister is fully lowered into the storage cask.
Figure 13:
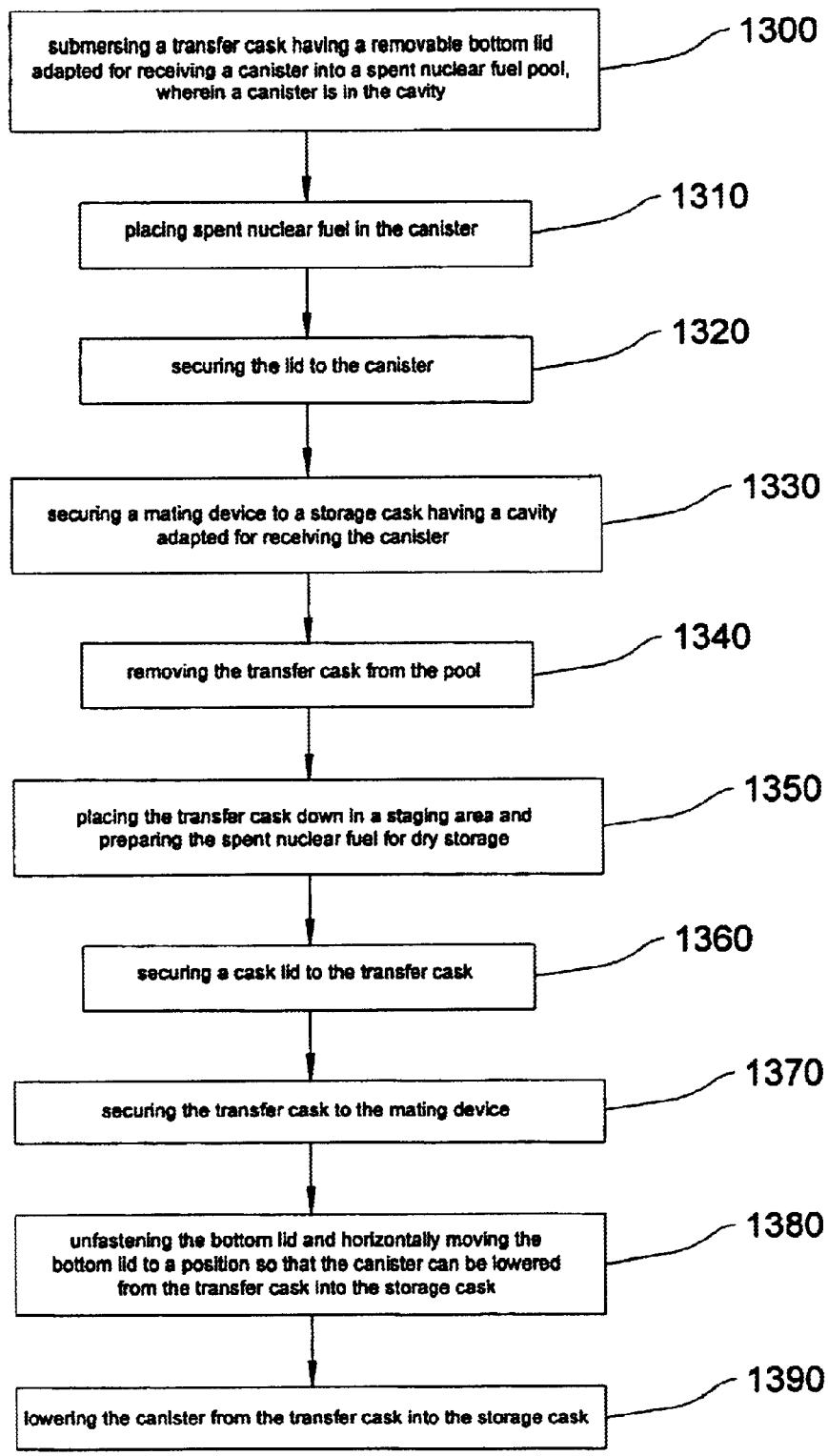
FIG. 13 is a flowchart of an embodiment of the method of the present invention.

FIG. 13 is a flowchart of an embodiment of the method of the present invention. The steps of FIG. 13 will be described in detail below using mating device 70 and transfer cask 30. Specifically, the steps of FIG. 13 will be discussed in relation to FIGS. 9–12 whenever possible.

In defueling a nuclear reactor and storing the spent nuclear fuel according to the method of the present invention, initially cask lid 33 is not secured to cylindrical body 31 of transfer cask 30 and canister lid 58 is not secured to canister 50. Open canister 50 is then lowered into cavity 40 of open transfer cask 30 wherein circular bottom lid 32 is secured to bottom flange 35. Transfer cask 30 (having open canister 50 within cavity 40) is then submerged into a spent nuclear fuel pool, completing step 1300 of FIG. 13. Once transfer cask 30 is fully submerged and resting at the bottom of the spent nuclear fuel pool, spent nuclear fuel is removed from the reactor as necessary and placed into open canister 50, completing step 1310 of FIG. 13. Once canister 50 is fully loaded with spent nuclear fuel, canister lid 58 is secured to canister 50, sealing both pool water and the spent nuclear fuel within canister 50. As such, step 1320 of FIG. 13 is completed.

At this point, transfer cask 30 (and loaded canister 50) are ready to be removed from the pool. However, before this occurs mating device 70 is secured to storage cask 90 (FIG. 9). Referring to FIG. 9, mating device 70 is secured to top surface 92 of storage cask 90 by positioning mating device 70 on top surface 92 so that cask connection holes 77 (FIG. 7) line up with threaded holes 93 (FIG. 10) located on top surface 92. Bolts 94 are then extended through cask connection holes 77 threadily engaging threaded holes 93. Moreover, at this point, slidable tray 74 of mating device 70 is in the closed position (see FIG. 7). As such, step 1330 of FIG. 13 is completed.

Once step 1330 has been performed (or possibly during or after), crane 60 (FIG. 6) completes step 1340 of FIG. 13 by lifting transfer cask 30 (having loaded canister 50 in cavity 40) from the pool. Transfer cask 30 is then set down in a staging area where the pool water is pumped out of canister 50, the spent nuclear fuel is allowed to dray, and the canister is backfilled with an inert gas such as helium and then resealed. Canister 50 is now ready for dry storage and step 1350 of FIG. 13 is completed.

At this point cask lid 33 (FIG. 3) is secured to cylindrical body 31 as described above, completing step 1360. Closed transfer cask 30 is then lifted by crane 60 and positioned above mating device 70 which is secured to storage cask 90. Once transfer cask 30 is positioned above mating device 70, crane 60 lowers transfer cask 30 down onto mating device 70 (see FIG. 9). As transfer cask 30 is being lowered onto top plate 71 of mating device 70, extrusion guides 76 help guide transfer cask 30 to its proper resting position. Transfer cask 30 is positioned so that the mating device connection holes 42 (FIG. 3) on bottom flange 35 line up with threaded holes 75 (FIG. 7) of mating device 70. Once properly positioned, bolts 95 are extended through mating device connection holes 42, threadily engaging threaded holes 75. As such, step 1370 of FIG. 13 is completed.

Figure 10:
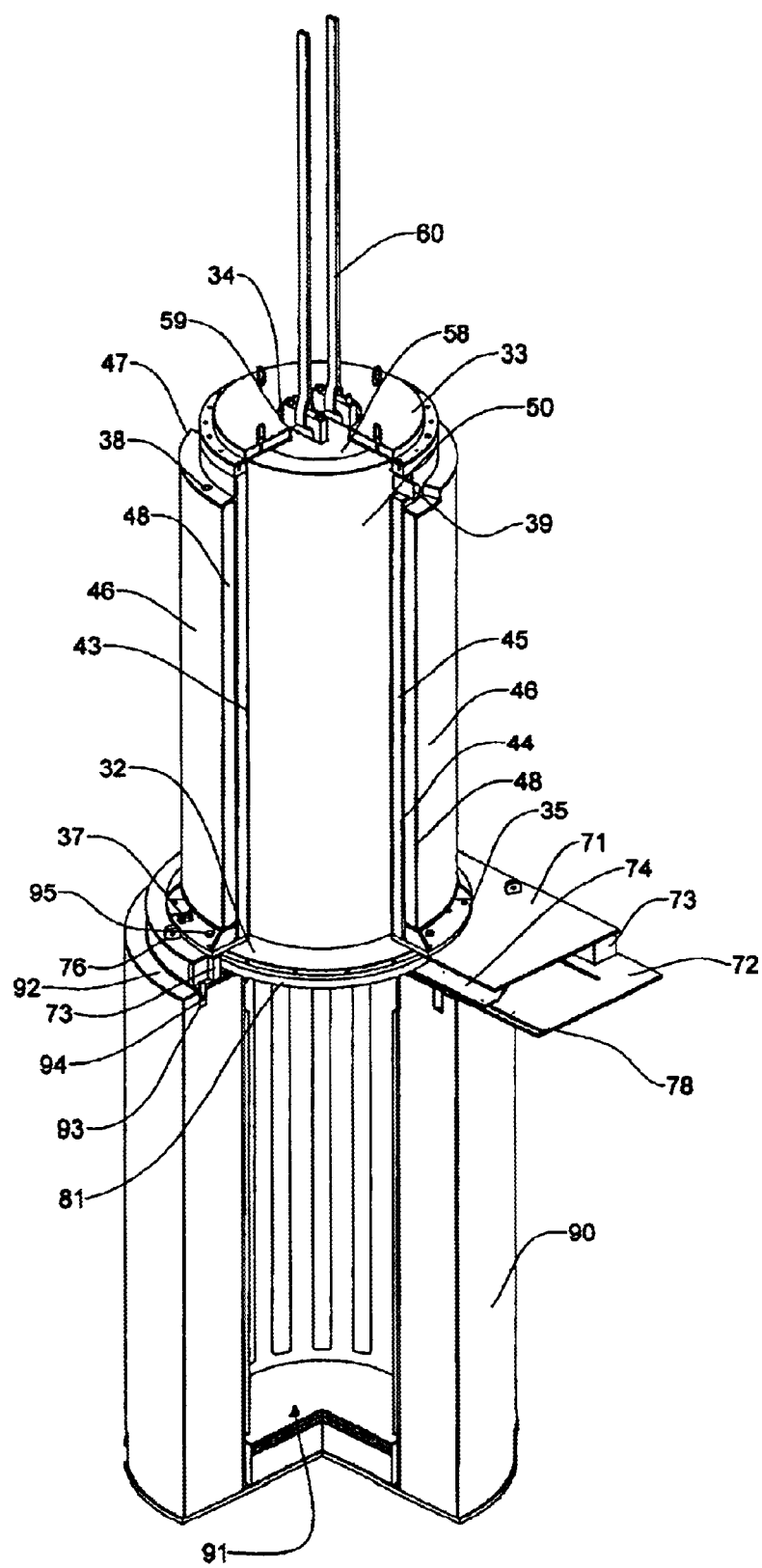
FIG. 10 is a perspective view of an embodiment of the system of the present invention in the stacked arrangement partially in section wherein the transfer cask's bottom lid has been unfastened and lowered onto the mating device's slidable tray which is in the closed position.

Referring to FIG. 10, once mating device 70 is properly secured to both storage cask 90 and transfer cask 30, cavity 40 (FIG. 5) of transfer cask 30, hole 83 and openings 80, 81 (FIG. 8) of mating device 70, and cavity 91 of storage cask 90 are substantially aligned. Once properly secured together, circular bottom lid 32 is unfastened from bottom flange 35 by removing bolts 49 (FIG. 5). Pneumatic lifters 79 (FIG. 7) engage circular bottom lid 32 and lower circular bottom lid 32 onto slidable tray 74 within elevated ring 88.

Referring to FIG. 11, once slidable tray 74 receives circular bottom lid 32, slidable tray 74 is moved to the open position as defined above. As such, slidable tray 74 slides on low friction tracks 78, horizontally removing circular bottom lid 32 so that a clear path through which canister 50 can pass from transfer cask 30 into storage cask 90 is formed. Thus, step 1380 of FIG. 13 is completed. Moreover, when circular bottom lid 32 and slidable tray 74 are moved to the open position, radiation absorbing shield 73 combined with circular bottom lid 32 substantially enclose the space between transfer cask 30 and storage 90 through which canister 50 will pass. In the illustrate embodiment, this is accomplished by designing U-shaped radiation shield 73 so that the diameter of circular bottom lid 32 is substantially equal to the perpendicular distance between the legs (i.e. the straight portions of the U-shape) of radiation shield 73. This design allows canister 50 to be lowered into storage cask 90 without radiation contaminating the outside environment in unacceptable levels.

Upon a clear path being formed between cavity 40 of transfer cask 30 and cavity 91 of storage cask 90, canister 50 is lowered from cavity 40 into cavity 91 until canister 50 is fully within storage cask 90 (FIG. 12). This lowering process is performed by crane 60. Crane 60 engages canister handles 59 located on canister lid 58 through cavity hole 34. In this way, crane 60, completes step 1390 of FIG. 13.

The foregoing discussion discloses and describes merely exemplary embodiments of the present invention. As will be understood by those skilled in this art, the invention may be embodied in other specific forms without departing from the spirit or essential characteristics thereof. Specifically, mating device 70 can be constructed so as not to include top and bottom plates 71, 72. In this embodiment, slidable tray 74 would slide on low friction trucks 78 which would be located on the interior of radiation shield 73. In such an embodiment, the storage cask and transfer cask are secured directly to the radiation shield. Accordingly, the disclosure of the present invention is intended to be illustrative, but not limiting, of the scope of the invention, which is set forth in the following claims.

What is claimed is:

1. A transfer cask for transporting a canister of spent nuclear fuel from a spent nuclear fuel pool to a storage cask, the transfer cask comprising:

a cylindrical body having a top surface, a bottom surface, and a cavity adapted for receiving the canister, the bottom surface comprising means for securing and unfastening a bottom lid and means for securing to a mating device, the top surface comprising means to secure a cask lid;

a bottom lid, the bottom lid acting as a floor for the cavity when secured to the bottom surface;

a cask lid;

a bottom seal positioned between the bottom lid and bottom surface and compressed between the bottom surface of the cylindrical body and the bottom lid so as to hermetically seal a bottom of the cavity; and an annulus seal at or near the top surface of the cylindrical body and positioned between the canister and the cylindrical body when the canister is resting in the cavity.

2. The transfer cask of claim 1 wherein when the bottom lid is secured to the bottom surface, a hermetic seal is formed.

3. The transfer cask of claim 1 wherein the means for securing the bottom lid and means for securing to the mating device are positioned on the bottom surface so that the bottom lid can be unfastened and removed from the bottom surface while the transfer cask is secured to a mating device.

4. The transfer cask of claim 1 wherein the bottom lid is circular having a circumference and the bottom surface is circular having a circumference, the circumference of the circular bottom lid being smaller than the circumference of the bottom surface.

5. The transfer cask of claim 1 wherein the bottom surface of the transfer cask is formed by a bottom flange.

6. The transfer cask of claim 5 wherein the means for securing a bottom lid is a plurality of bottom lid bolt holes and the bottom lid comprises a plurality of threaded holes, the bottom lid being secured to the bottom flange by extending bolts through the bottom lid bolt holes and threadily engaging the threaded holes of the bottom lid.

7. The transfer cask of claim 5 wherein the means for securing to a mating device is a plurality of mating device connection holes, the transfer cask being secured to a mating device by extending bolts through the mating device connection holes of the bottom flange and threadily engaging threaded holes located on the mating device.

8. The transfer cask of claim 5 wherein the bottom flange is circular having an outer perimeter and the means for securing to the mating device are closer to the outer perimeter than the means for securing the bottom lid.

9. The transfer cask of claim 1 wherein the bottom seal comprises a gasket fitted in a groove on the bottom lid.

10. The transfer cask of claim 1 wherein the annulus seal is a circular gasket.

11. The transfer cask of claim 1 wherein the bottom lid is secured directly to the bottom surface of the cylindrical body.

12. The transfer cask of claim 11 wherein the bottom lid is a unitary plate.

13. The transfer cask of claim 12 wherein the bottom seal comprises a gasket fitted in a groove on the bottom lid, the gasket compressed between the bottom surface of the cylindrical body and the bottom lid so as to hermetically seal a bottom of the cavity.

* * * * *